Feb. 19, 1935.  H. HASTINGS  1,991,553
THERMOMETER
Filed July 29, 1932
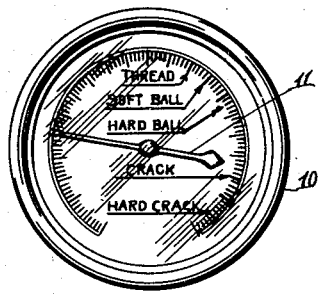
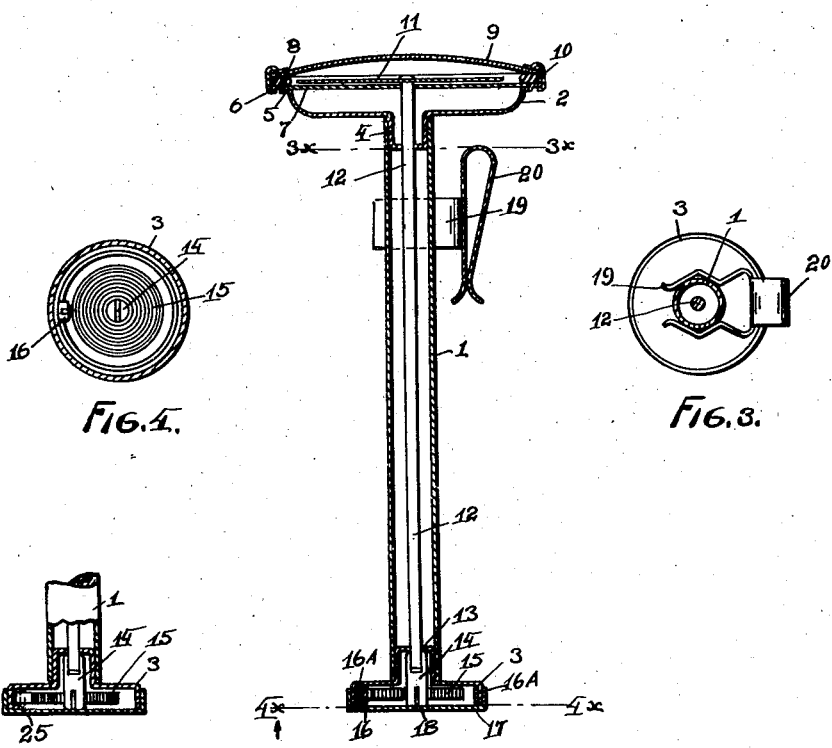
INVENTOR
HERBERT HASTINGS
BY
ATTORNEY Patented Feb. 19, 1935

1,991,553

UNITED STATES PATENT OFFICE 1,991,553

THERMOMETER

Herbert Hastings, Brighton, N. Y.

Application July 29, 1932, Serial No. 625,681

4 Claims. (Cl. 73—118)

This invention relates to bi-metallic thermometers and has for its object to provide a novel construction for such a thermometer to make it especially adaptable for use as a candy or fat thermometer.

Another object of this invention is to provide a candy or fat thermometer which is practically nonbreakable, A further object of this invention is to provide a candy or fat thermometer having a smooth and easily cleanable surface.

Another object of this invention is to provide a candy or fat thermometer with a dial on which the indications may be read without removing the thermometer from the container on which it is mounted.

Another object of this invention is to provide a bi-metallic thermometer in which the thermoresponsive element is mounted in a chamber which is spaced from the dial housing by a separating chamber.

Another object of this invention is to provide a thermometer with a dial in which the radial calibrations are grouped by parallel indications in the center of the dial.

All these and other objects of this invention will become more apparent from the detailed description thereof which follows, reference being had to the accompanying drawing in which Figure 1 is a top plan view of the thermometer.

Figure 2 is a vertical sectional view of the thermometer.

Figure 3 is a horizontal sectional view thereof taken on the line 3x—3x of Figure 2.

Figure 4 is a horizontal sectional view of the thermometer taken on the line 4x—4x of Figure 2.

Figure 5 is a vertical sectional view of a modified form of the thermo-responsive element and its housing.

In the several figures of the drawing like reference numerals indicate like parts.

The thermometer forming the subject matter of this invention is a further development of the bi-metallic thermometer illustrated and described in my prior application, Serial No. 600,257 for use in another field and is made up of a tubular upright or supporting member or stem portion 1 which carries at the top a dial housing 2 and at the bottom the thermoresponsive element housing 3. The bottom and sides of the dial housing are formed up of sheet metal with a hollow boss 4 of reduced diameter projecting from the bottom of the housing. This boss is telescoped into the upper end of the tubular upright 1 and is suitably held hermetically sealed therein. In the side of the dial housing are provided the dial seat 5 and the gasket seat 6 in the form of annular shoulders one above the other. The edge of the dial 7 is supported on the dial seat and the gasket 8 is placed above it on the gasket seat in such a manner that a part of the gasket overhangs the edge of the dial 7 to provide a seal between the perimeter of the dial and the dial seat. The crystal 9 is located over the dial on top of the gasket 8, while the bezel 10, which encircles the housing, clamps the edge of the crystal down onto the gasket and slightly compresses the gasket to expand it and thus seal the inside of the dial housing.

Within the dial housing is mounted the indicator 11 which is carried at the upper end of the indicator shaft 12. This shaft projects thru a central opening in the dial 7 and extends thru an opening in the boss 4 into and thru the tubular upright or support 1 as illustrated in Figure 1.

The thermoresponsive element housing 3 is provided at the top with a hollow boss 13 which is telescoped into the tubular upright 1 and is suitably held hermetically sealed therein. Within this boss and the housing 3 is mounted the hub 14 which is hollow at one end to receive the lower end of the indicator shaft 12 and is slotted at the opposite end to have the inner end of the bi-metallic spring 15 anchored thereto. This spring surrounds the hub 14 within the housing 3 and its outer free end is held fixed in the bifurcated lug 16 bent inwardly from the ring shaped flange 16A. This flange is telescoped into the inside of the housing 3 and is held frictionally in place therein so that it may be turned in either direction for the purpose of calibrating the bi-metallic spring 15. A cover 17 is telescoped over the outside of the housing 3 and closes the open bottom thereof. The cover also provides in the center a thrust bearing 18 on which the hub 14 of the bi-metallic springs can rotate. From the foregoing it will be seen that the thermoresponsive element is spaced from the dial housing by a sealed chamber provided by the tubular upright 1 which is closed at the top and bottom by the boss 4 and boss 13 respectively. The temperature of the air within the dial housing and within the upright 1 can therefore have no appreciable effect on the indication as given by the thermoresponsive element mounted in the housing 3.

The thermometer is adjustably held suspended by means of the spring clip 19 which is made up of a pair of horizontal spring fingers which engage the upright or support 1 at opposite sides and yieldingly keep in frictional contact therewith so that the upright can be moved up or down thereon when it is desired to raise or lower the thermometer within the vessel in which it is held suspended. On the outside of the spring clip 18 is provided an inverted U-shaped clamp 20 which can be readily slipped over the edge of the vessel to hold the clip attached thereto. By means of such vertical adjustability, the flat and compact sensitive element and its housing may be positioned at a suitable predetermined point in the liquid in the vessel or container for accurately indicating the average temperature thereof. That is, the sensitive element and its housing may be located sufficiently below the surface of the liquid to avoid undue influence by any cooling of the surface, and also at a sufficient distance from the bottom of the container to avoid undue influence by the high temperature of the vessel bottom.

As will be seen from an inspection of Figure 1 the housing 3 is so proportioned as to closely encase the thermoresponsive bi-metallic spring 15 in order to reduce to a minimum the heat insulating effect of the air surrounding the thermoresponsive element and make the thermometer quickly responsive to any change in the temperature of the liquid or semi-liquid by which it is surrounded. The hole in the hollow boss 13 near the lower end of the upright 1 and the hole in the hollow boss 4 near the upper end of the upright provide suitable bearings which keep the indicator shaft in proper alignment within the upright with a minimum amount of friction so that the movement of the thermoresponsive element is quickly and efficiently transmitted to the indicator 11.

Instead of providing a separate flange 16A for the purpose of adjustably holding the end of the bi-metallic spring within the housing 3, a bifurcated lug 25 may be provided and bent in from the housing 3 as illustrated in Figure 5 so that the bi-metallic spring can be calibrated within the housing by simply turning the housing on the upright 1.

It will be seen from the above description and drawing that the invention involves the use of a compact thermoresponsive element of substantially flat spiral shape which includes a minimum of inert air space. The housing for this element is closely fitted thereto in shape for sensitively transmitting thereto external temperatures to be measured. The housing is substantially closed about the element and also against communication with the space in the instrument stem, and the housing and stem portion are sealed against admission of the material to be tested. Such construction provides for the inclusion of a minimum amount of inert air space about the sensitive element, as well as protecting the element against interference by the material to be tested, which largely increases the sensitivity of the instrument, and the sealed character of this construction affords an instrument which is readily cleaned and sterilized. The dial is readily visible and readable from above the container in which the instrument is mounted. The mounting means is adapted to be detachably engaged with the upper edge of the side wall of a container and holds the instrument so that it may be rotated or oriented for convenience in reading and so that it may be moved longitudinally to adjust the sensitive element housing to correspond with the level of the material to be tested. Such features afford an instrument which is particularly accurate, practical, and convenient for the purposes described, while the structure details are efficient in operation and such as can be manufactured at a comparatively low cost.

I claim:

1. A thermometer comprising a stem portion provided with indicating means, a substantially flat spiral thermoresponsive element arranged substantially in a plane transverse to said stem portion, a housing for said element closely fitting the same in shape for sensitively transmitting external temperatures thereto, said housing being substantially closed against communication with said stem and having a fluid-tight connection with said stem for excluding the material to be tested, and an operating connection through said stem between said element and indicating means.

2. A thermometer comprising a substantially flat spiral thermoresponsive element, a substantially closed housing closely fitting and adjustably supporting said element and having a projecting boss, a tubular member extending substantially transversely of said element and having one end in telescoping engagement with said boss for sealing said housing from said member and the material to be tested, an indicator housing on the other end of said member provided with a dial arranged transversely of said member, a shaft in said member having a connection with said element arranged for limiting engagement with opposite sides of said element housing, and an indicator hand on said shaft cooperating with said dial.

3. A thermometer comprising a substantially flat spiral thermoresponsive element, a substantially closed housing closely fitting said element in shape for sensitively transmitting external temperatures thereto, and having a projecting boss, indicating means, a housing for said means having a projecting boss, an elongated tubular member having one end in fluid tight telescoping engagement with the boss of said element housing, and its other end in telescoping engagement with the boss of said housing for said indicating means, and a shaft extending through said tubular member and connected at one end with said element and at the other with said indicating means.

4. A thermometer comprising a substantially flat spiral thermoresponsive element, a substantially closed housing closely fitting said element in shape for sensitively transmitting external temperatures thereto and having a projecting boss, indicating means, a housing for said means having a projecting boss, an elongated tubular member having one end in fluid tight telescoping engagement with the boss of said element housing and its other end in telescoping engagement with the boss of said housing for said indicating means, said housing bosses being formed with bearing openings and a shaft in said member rotatably supported in said bearing openings connected at one end with said element and at the other end with said indicating means.

HERBERT HASTINGS.